United States Patent
Takuwa

(10) Patent No.: US 10,547,759 B2
(45) Date of Patent: Jan. 28, 2020

(54) IMAGE FORMING APPARATUS

(71) Applicant: TOSHIBA TEC KABUSHIKI KAISHA, Tokyo (JP)

(72) Inventor: Noriyuki Takuwa, Yokohama Kanagawa (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/129,437

(22) Filed: Sep. 12, 2018

(65) Prior Publication Data
US 2019/0082060 A1    Mar. 14, 2019

(30) Foreign Application Priority Data

Sep. 14, 2017 (JP) ................. 2017-176874

(51) Int. Cl.
*H04N 1/00* (2006.01)
*H04N 1/04* (2006.01)
*G06F 3/12* (2006.01)

(52) U.S. Cl.
CPC ......... *H04N 1/0079* (2013.01); *G06F 3/1201* (2013.01); *H04N 1/00352* (2013.01); *H04N 1/00496* (2013.01); *H04N 1/04* (2013.01)

(58) Field of Classification Search
CPC .. H04N 1/00; H04N 1/00352; H04N 1/00496; H04N 1/00543; H04N 1/0079; H04N 1/00976; H04N 1/00989; H04N 1/03; H04N 1/04; H04N 1/1013; H04N 1/193; H04N 2201/02456; H04N 2201/02468; H04N 2201/02485; H04N 2201/02495

USPC ........ 271/274, 117, 124, 162; 399/106, 258, 399/260, 262; 358/474, 482, 497, 505
See application file for complete search history.

(56) References Cited

U.S. PATENT DOCUMENTS

| 7,483,659 | B2 * | 1/2009 | Takuwa | G03G 15/0872 399/262 |
| 7,676,182 | B2 * | 3/2010 | Takuwa | G03G 15/0872 399/119 |
| 7,809,305 | B2 * | 10/2010 | Takuwa | G03G 15/161 399/302 |
| 8,032,071 | B2 | 10/2011 | Andoh et al. | |
| 8,228,511 | B2 * | 7/2012 | Takuwa | H04N 1/00496 358/1.12 |
| 8,538,281 | B2 * | 9/2013 | Takuwa | G03G 15/0126 399/27 |
| 8,876,420 | B2 * | 11/2014 | Iijima | B65H 29/58 347/104 |
| 9,150,023 | B2 * | 10/2015 | Okamoto | B41J 2/1752 |
| 9,637,337 | B2 * | 5/2017 | Takuwa | B65H 7/20 |
| 10,073,402 | B2 * | 9/2018 | Takuwa | G03G 15/6552 |
| 2011/0135364 | A1 | 6/2011 | Takuwa | |

(Continued)

*Primary Examiner* — Negussie Worku
(74) *Attorney, Agent, or Firm* — Kim & Stewart LLP

(57) ABSTRACT

In one embodiment, an image forming apparatus has a discharge portion and a guide member. The discharge portion has a space surrounded by wall surfaces of a chassis, and a side opening portion to open the space. The discharge portion receives a sheet to be discharged from a discharge port of the chassis, and houses the sheet in the space so that the sheet can be taken out from the side opening portion. The guide member is arranged at an end portion in the side opening portion, and extends toward upward from the rear side toward the front side of the chassis.

15 Claims, 7 Drawing Sheets

(56) References Cited

U.S. PATENT DOCUMENTS

| | | | |
|---|---|---|---|
| 2015/0090060 A1* | 4/2015 | Kobayashi | G03G 21/1647 74/412 R |
| 2015/0115519 A1* | 4/2015 | Takezawa | B65H 3/0669 271/117 |
| 2017/0045852 A1* | 2/2017 | Wada | B65H 29/125 |
| 2018/0059610 A1* | 3/2018 | Takuwa | G03G 15/6552 |

* cited by examiner

IMAGE FORMING APPARATUS

CROSS-REFERENCE TO RELATED APPLICATION

This application is based upon and claims the benefit of priority from the prior Japanese Patent Application No. 2017-176874, filed on Sep. 14, 2017, the entire contents of which are incorporated herein by reference.

FIELD

Embodiments described herein relate generally to an image forming apparatus.

BACKGROUND

An image forming apparatus has a discharge portion formed in a chassis, and a discharge port to discharge a sheet to the discharge portion. The image forming apparatus may have the discharge port to discharge a sheet from a front side (a front side) toward a rear side (a rear side) in the depth direction of the chassis. In the image forming apparatus of this kind, the discharge port is formed at a side surface at the front side of the discharge portion. By this means, a user cannot take out the sheet housed in the discharge portion directly from the discharge portion to the front side. That is, the sheet housed in the discharge portion is to be taken out from the side or the upper side of the discharge portion. Accordingly, the workability at the time of taking out the sheet from the discharge portion might become worth.

DETAILED DESCRIPTION

According to one embodiment, an image forming apparatus has a chassis, a discharge portion, and a guide member. The chassis has a discharge port to discharge a sheet formed with an image in a first direction directing from a front side toward a rear side opposite to the front side. The discharge portion has a space surrounded by wall surfaces of the chassis, and a side opening portion to open the space toward one direction out of second directions orthogonal to the first direction. The discharge portion receives the sheet to be discharged from the discharge port, and houses the sheet in the space so that the sheet can be taken out from the side opening portion. The guide member is arranged at an end portion at the front side in the side opening portion. The guide member extends along the first direction, and has an upper edge extending toward upward from the rear side toward the front side in the first direction.

Hereinafter, image forming apparatuses of embodiments will be described with reference to the drawings. In addition, in the following description, the same symbols are given to the components having the same or the similar functions. And, the duplicated description of the components given with the same symbol may be omitted. In addition, in the following description, the vertical direction indicates a vertical direction on the basis of the state in which the image forming apparatus is installed on a horizontal installation surface.

(First Embodiment)

Figure 1:
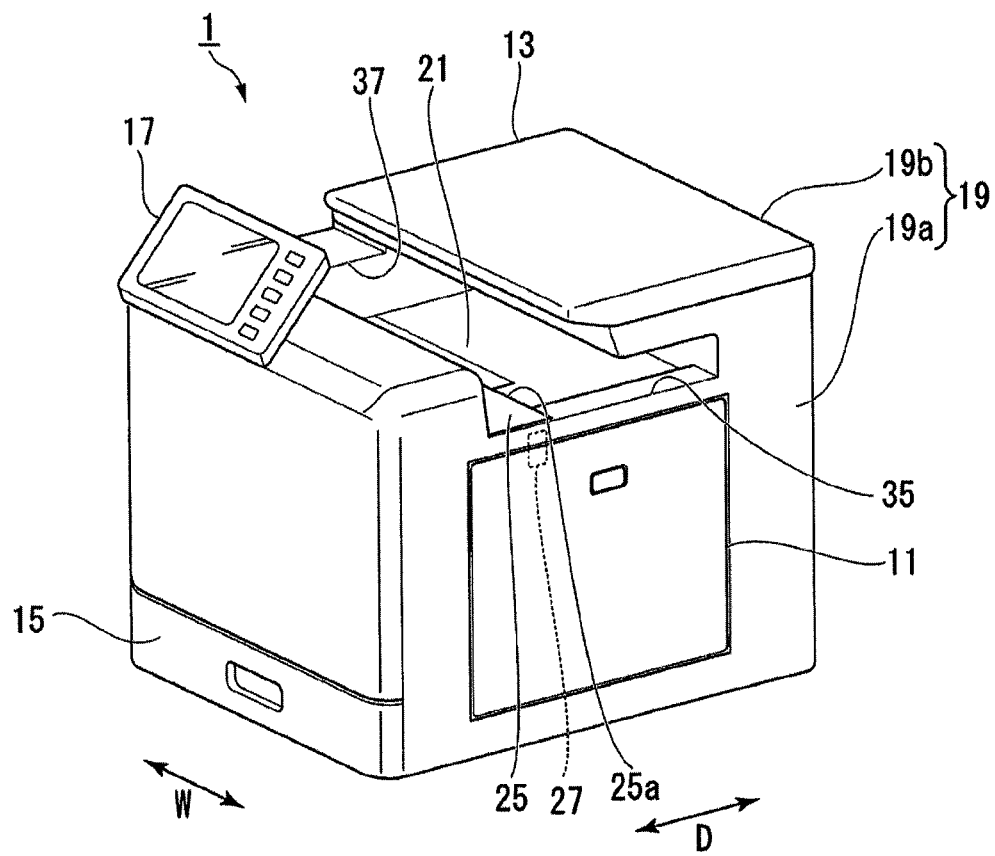
FIG. 1 is a perspective view showing an image forming apparatus of a first embodiment.

FIG. 1 is a perspective view showing an image forming apparatus of a first embodiment. As shown in FIG. 1, an image forming apparatus 1 is a multi function peripheral (MFP: Multi Function Peripheral), for example. However, the image forming apparatus 1 is not limited to the above-described example, but may be a copying machine, a printer, or the like.

Figure 2:
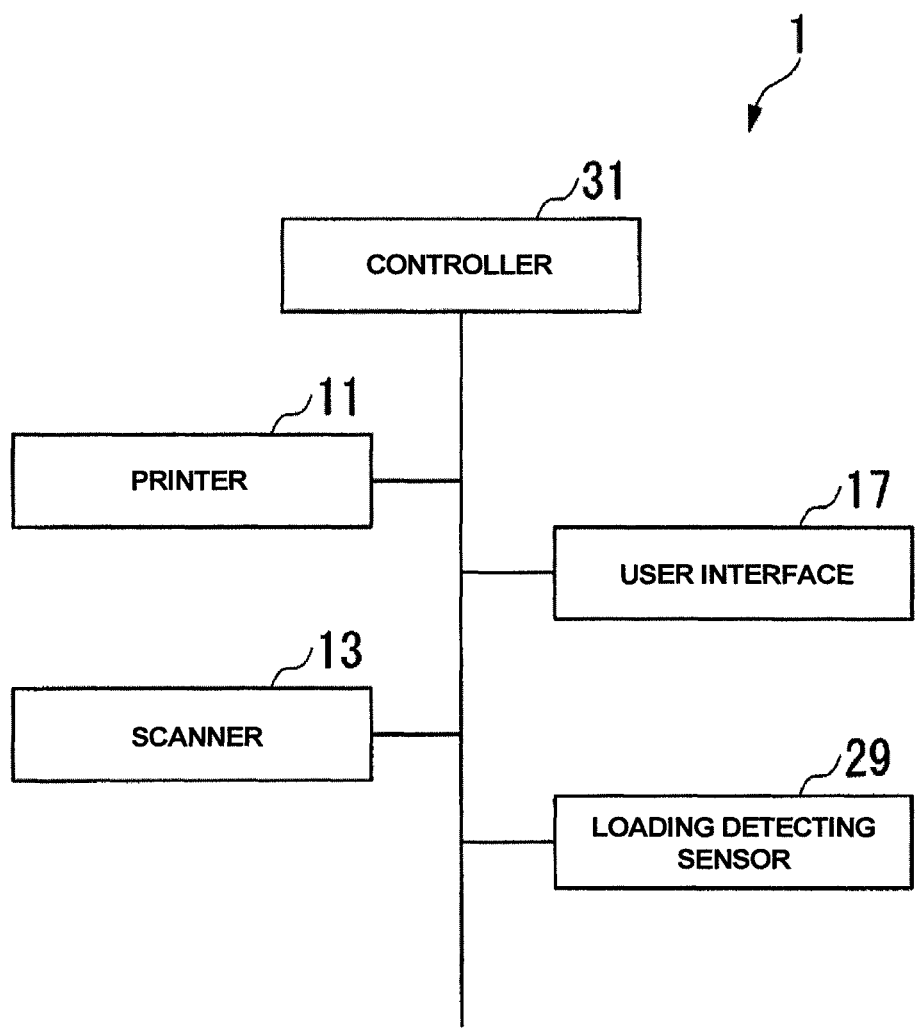
FIG. 2 is a block diagram showing a system configuration of the image forming apparatus of the first embodiment.

FIG. 2 is a block diagram showing a system configuration of the image forming apparatus of the first embodiment. As shown in FIG. 1 and FIG. 2, the image forming apparatus 1 has a user interface 17 to accept an operation for image forming, and so on, and forms an image on a sheet in accordance with the operation accepted by the user interface 17. The image forming apparatus 1 further has a printer 11, a scanner 13, a sheet housing device 15, a chassis 19, a discharge portion 21, a discharge port 23 (refer to FIG. 3 or FIG. 4), a guide member 25, an energizing member 27, a loading detecting sensor 27 (a second sensor), and a controller 31.

As shown in FIG. 1, the printer 11 forms an image on a sheet such as paper, based on image information generated by the scanner 13 or image information received via a communication path. The printer 11 forms an image by the following processings, for example. An image forming unit of the printer 11 forms an electrostatic latent image on a photoreceptor drum, based on the image information. The image forming unit of the printer 11 attaches a developer to the electrostatic latent image to form a visible image (a developer image) on the photoreceptor drum. There is a toner, as a specific example of the developer. A transfer unit of the printer 11 transfers the visible image from the photoreceptor drum to a sheet, directly or via a transfer medium such as a transfer belt. A fixing unit of the printer 11 heats and pressurizes the sheet to fix the visible image on the sheet. The printer 11 has a sheet conveying unit inside thereof. The sheet conveying unit conveys the sheet on a conveying path from the sheet housing device 15 through the transfer unit and the fixing unit to the discharge portion 21.

The scanner 13 reads an image that is an object to be read as brightness and darkness of light. For example, the scanner 13 reads an image printed on a sheet that is the object to be read which has been set on a document placing table not shown. The scanner 13 outputs image data in accordance with a read image. For example, the image data outputted from the scanner 13 is stored in a memory not shown, for example. In addition, an image in accordance with the image data which has been once stored in the memory is formed on a sheet by the printer 11, for example. The sheet housing device 15 houses a sheet to be used for image forming processing in the printer 11.

The user interface 17 includes a control panel. The control panel has a display and an input acceptance unit. The display displays various information. For example, the display displays guidance of an operation and a work relating to the image forming apparatus 1, by characters, an image, or a video image. The input acceptance unit includes a plurality of buttons. The input acceptance unit accepts an input of various operation instructions.

The chassis 19 forms an outline of the image forming apparatus 1. The chassis 19 houses the printer 11, the scanner 13, the sheet housing device 15, the controller 31, and so on. And the chassis 19 supports the user interface 17. The chassis 19 includes a printer chassis 19a to mainly house the printer 11 and a scanner chassis 19b to house the scanner 13.

Figure 3:
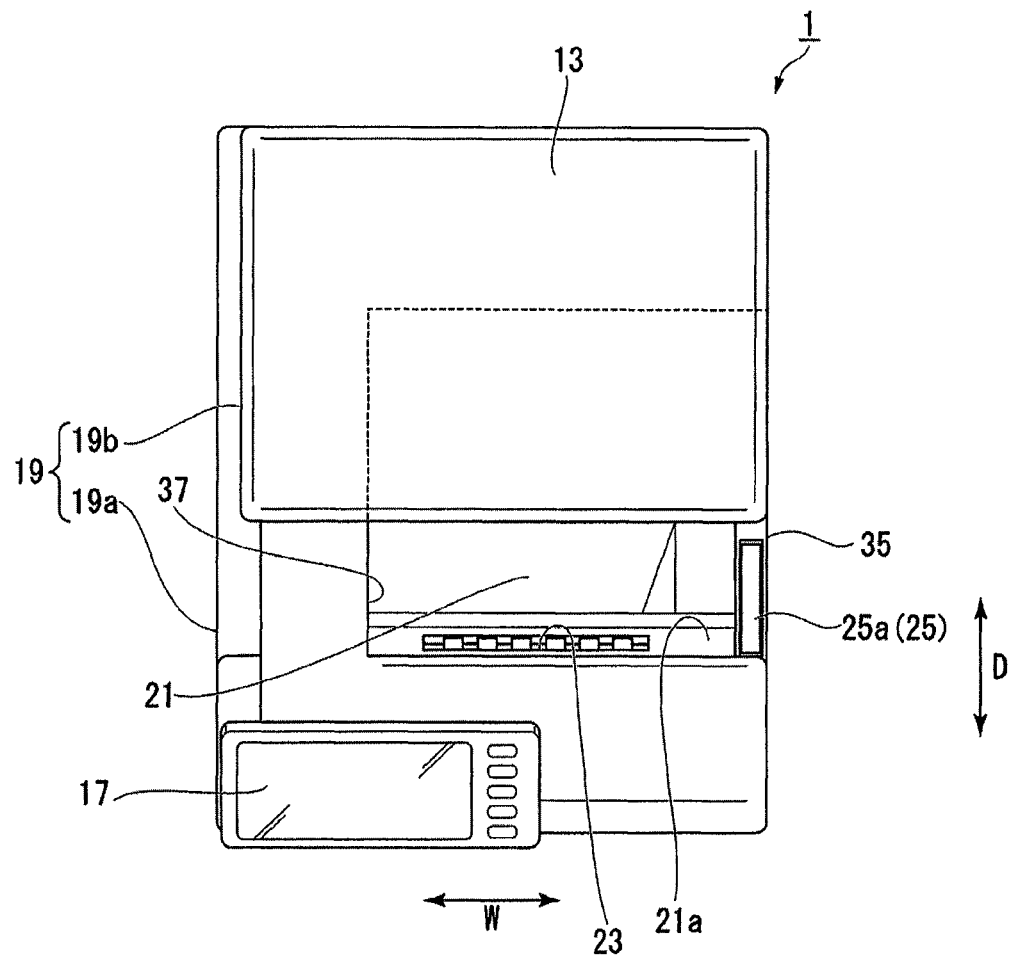
FIG. 3 is a plan view showing the image forming apparatus of the first embodiment.

FIG. 3 is a plan view showing the image forming apparatus 1 of the first embodiment. As shown in FIG. 1 and FIG. 3, the chassis 19 is formed in a rectangular shape extending along two directions orthogonal to each other when seen from the vertical direction. Here, a depth direction and a width direction of the chassis 19 are defined as described below. The depth direction of the chassis 19 is a direction which is horizontal and one direction of the above-described two directions along which the chassis 19 extends, and in which the chassis 19 and a user to operate the user interface 17 are in a line. In the depth direction of the chassis 19, a side of the chassis 19 at which the user operates, that is a side of the chassis 19 where the user interface 17 is provided is defined as a front side. And, in the depth direction of the chassis 19, a side opposite to the side at which the user operates across the chassis 19, that is a side opposite to the front side is defined as a rear side. In addition, the width direction of the chassis 19 is a direction which is horizontal and the other direction of the above-described two directions along which the chassis 19 extends. That is, the width direction of the chassis 19 is a direction orthogonal to the depth direction of the chassis 19. In the following description, the depth direction of the chassis 19 is simply referred to as a first direction, and is given with a symbol D, and the width direction of the chassis 19 is simply referred to as a second direction, and is given with a symbol W.

The printer chassis 19a is formed in a rectangular solid shape extending in the both directions of the first direction D and the second direction W. The scanner chassis 19b is arranged on the upper portion of the printer chassis 19a. The scanner chassis 19b is formed in a rectangular shape extending in the both directions of the first direction D and the second direction W when seen from the vertical direction. The scanner chassis 19b is provided so that the end portion thereof overlaps the end portion at the rear side of the printer chassis 19a when seen from the vertical direction. In addition, the sheet housing device 15 is provided drawably from the side surface at the front side of the chassis 19 to the front side. In addition, the user interface 17 is fitted on an end portion at the front side in the upper portion of the printer chassis 19a of the chassis 19, and is arranged in the state in which a display surface of the display is directed toward the front side.

As shown in FIG. 1, the discharge portion 21 is formed on the upper portion of the printer chassis 19a of the chassis 19. The discharge portion 21 has a space surrounded by the wall surfaces of the above-described chassis 19, and a side opening portion 35 to open the above-described space toward one direction out of the second directions orthogonal to the above-described first direction. The discharge portion 21 receives a sheet which is conveyed inside the printer chassis 19a by the sheet conveying device of the printer 11 and thereby is formed with an image, and is discharged from the printer chassis 19a. And the discharge portion 21 houses the above-described sheet in the above-described space in such a manner that the above-described sheet can be taken out from the side opening portion 35. Specifically, the side opening portion 35 to open the above-described space toward one direction side in the second direction W (the right direction side in FIG. 3, for example), at one side portion of the discharge portion 21 in the second direction W. In addition, the other side portion of the discharge portion 21 in the second direction W (the left side in FIG. 3, for example) is blocked by the wall surface of the chassis 19. In addition, the side portion at the front side and the side portion at the rear side of the discharge portion 21 in the first direction D are also blocked by the wall surfaces of the chassis 19. In addition, the bottom portion of the discharge portion 21 is blocked by the upper surface of the printer chassis 19a. That is, the discharge portion 21 is formed in a rectangular shape when seen from the vertical direction (refer to FIG. 3), and has a concave portion (a space) recessed toward the lower side. In addition, the upper portion of the discharge portion 21 is blocked from the upper side by the scanner chassis 19b, in the region at the rear side in the first direction D. In addition, an upper opening portion 37 opening toward the upper side is formed, in the region of the upper portion of the discharge portion 21 except the region at the above-described rear side, that is, in the region at the front side in the first direction D.

Figure 4:
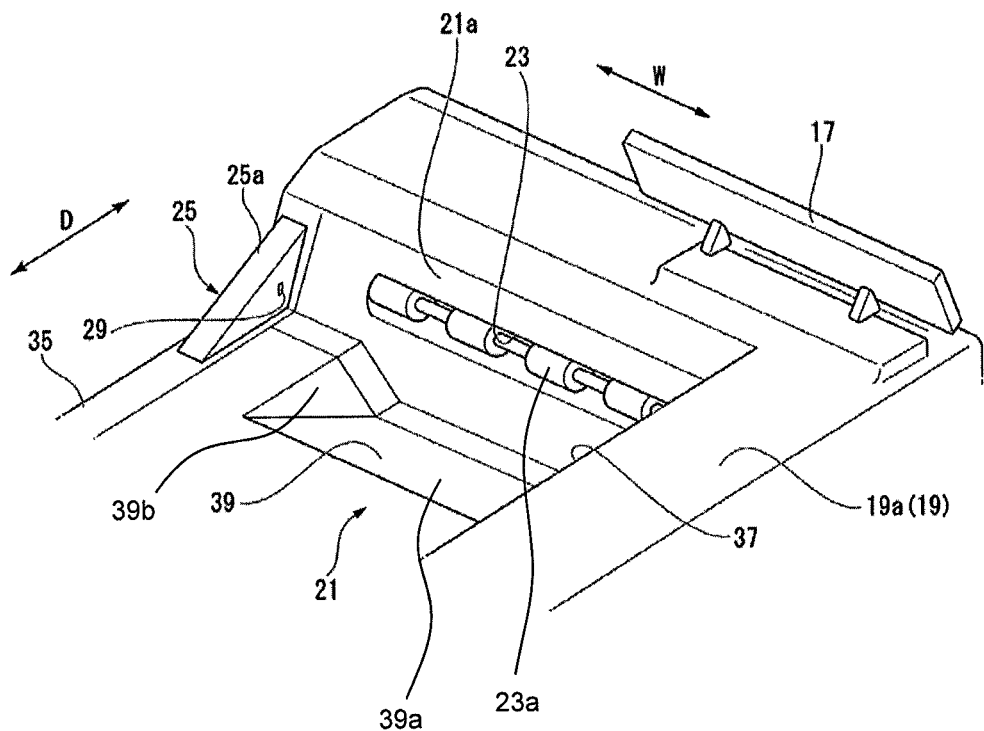
FIG. 4 is a perspective view showing the image forming apparatus of the embodiment.

FIG. 4 is a perspective view showing the image forming apparatus 1 of the first embodiment. As shown in FIG. 4, a concave portion 39 is formed on the bottom surface of the discharge portion 21. The concave portion 39 is provided at the end portion region at the front side of the discharge portion 21 in the first direction D. For example, the concave portion 39 is formed by a slope surface 39a extending downward from the rear side toward the front side in the first direction D, and a slope surface 39b extending downward from the side opening portion 35 side toward its opposite side (the left side in FIG. 4, for example) in the second direction W. The concave portion 39 is provided at a position approximately coincident with the discharge port 23 described later in the second direction W.

The discharge port 23 is formed in a side surface 21a (a wall surface of the chassis 19 facing the rear side) at the front side of the discharge portion 21 in the first direction D. The discharge port 23 extends along the second direction W. The discharge port 23 discharges the sheet conveyed by the sheet conveying unit of the printer 11. The discharge port 23 opens toward the rear side in the first direction D, and discharges the conveyed sheet from the front side toward the rear side in the first direction D. A plurality of discharge rollers 23a that are a part of the sheet conveying unit are exposed at the discharge port 23, for example.

The guide member 25 is arranged at the end portion at the front side in the first direction D in the side opening portion 35. The guide member 25 is a member which has a triangular shape, for example, when seen from the second direction W, and has a thickness in the second direction W. Regarding the guide member 25, one side (a lower edge 25b: refer to FIG. 5) out of the three sides of the above-described triangle extends along the first direction D, and another side (a side edge 25c: refer to FIG. 5) extends along a side surface 21a of the discharge portion 21, when the guide member 25 is at a first position described later. In addition, the guide member 25 is arranged at a position not to disturb discharge of the sheet from the discharge port 23, when it is at the first position described later. Specifically, the guide member 25 is arranged at a position not overlapping the discharge port 23 when seen from the first direction D, that is, at a position distant from the discharge port 23 toward the side opening portion 35 side.

Figure 5:
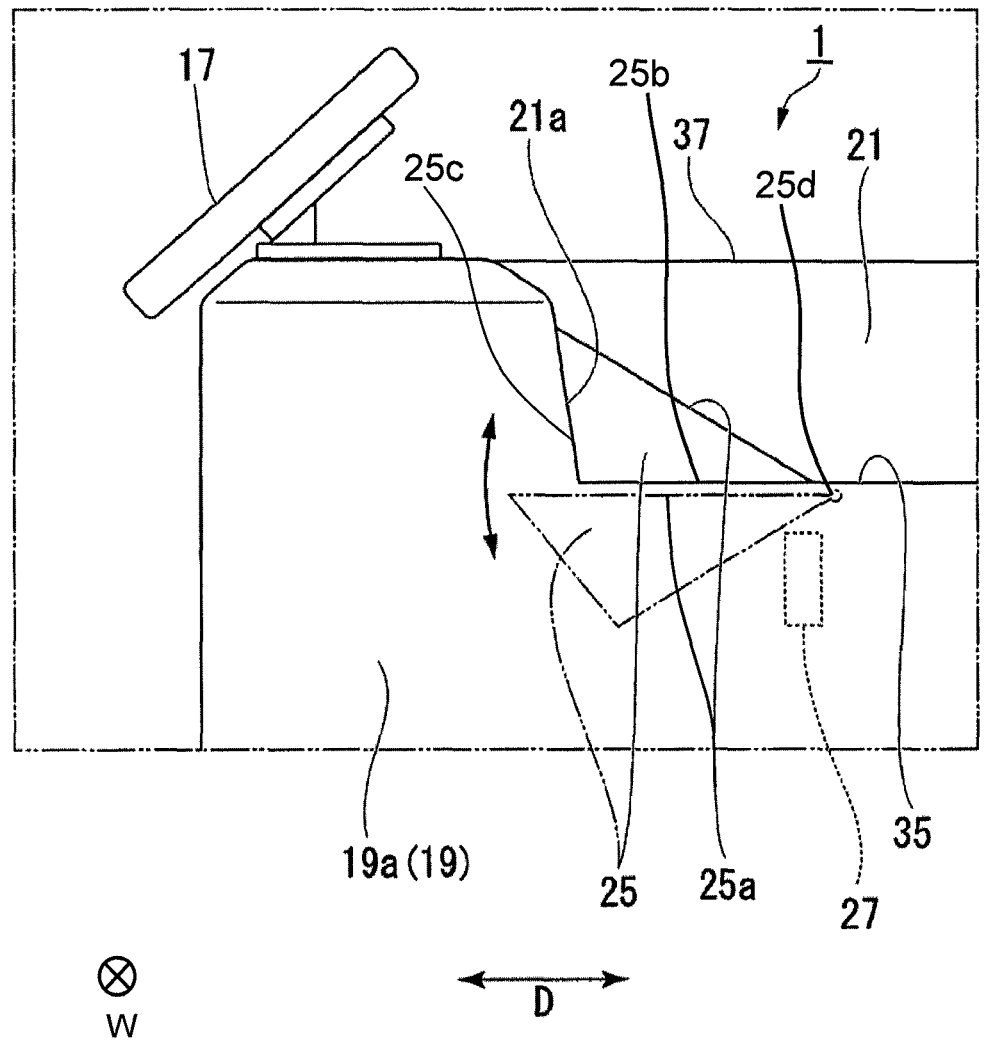
FIG. 5 is a side view showing the image forming apparatus of the embodiment.

FIG. 5 is a side view showing the image forming apparatus 1 of the first embodiment. As shown in FIG. 5, the guide member 25 is provided so as to block the lower side and the corner portion at the front side of the side opening portion 35 when seen from the second direction W. A remaining side (an upper edge 25a) out of the three sides of the above-described triangle of the guide member 25 extends toward upward from the rear side toward the front side in the first direction D, when the guide member 25 is at the first position described later. The upper edge 25a of the guide member 25 is formed in a planer shape along the second direction W (refer to FIG. 5). Further, the upper edge 25a of the guide member 25 extends linearly when seen from the second direction W. The end portion at the rear side of the upper edge 25a of the guide member 25 (the apex portion of the above-described triangle composed of the upper edge 25a and the lower edge 25b) connects to the bottom surface of the discharge portion 21. The end portion at the front side of the upper edge 25a of the guide member 25 (the apex portion of the above-described triangle composed of the upper edge 25a and the side edge 25c) connects to the side surface 21a at the front side of the discharge portion 21, when the guide member 25 is at the second position described later. The end portion at the front side of the upper edge 25a of the guide member 25 is located at a position higher than the discharge port 23, when the guide member 25 is at the first position described later (refer to FIG. 4 or FIG. 5).

The guide member 25 is rotatably supported on the chassis 19. A rotation center 25d of the guide member 25 is provided at the end portion at the rear side of the guide member 25 (the apex portion of the above-described triangle composed of the upper edge 25a and the lower edge 25b). The guide member 25 is formed so that it is rotated with respect to the chassis 19 and thereby it can move toward the lower side. The guide member 25 is rotated with respect to the chassis 19 and is moved toward the lower side, and thereby can be retracted from the discharge portion 21 into the chassis 19. Here, the first position and the second position in a moving range (a rotation range) of the guide member 25 will be defined as described below. The first position is a position which is an upper end position in the moving range of the guide member 25, and in which the guide member 25 blocks the lower side and the corner portion at the front side of the side opening portion 35 when seen from the second direction W (a position shown by a solid line in FIG. 5). The second position is a position which is at a lower side than the first position, and in which the guide member 25 is completely retracted from the discharge portion 21 into the chassis 19 (a position shown by a chain double-dashed line in FIG. 5).

The energizing member 27 energizes the guide member 25 toward the upper side, for example. The energizing member 27 holds the guide member at the first position by an arbitrarily set energizing force. The energizing member 27 is a coil spring, for example. The energizing member 27 is arranged in the chassis 19, for example.

As shown in FIG. 4, the loading detecting sensor 29 is provided in the guide member 25. The loading detecting sensor 29 is an optical sensor, for example. The loading detecting sensor 29 detects sheets which have been housed at a height not less than a prescribed height. That is, the loading detecting sensor 29 detects that the sheets discharged from the discharge port 23 to the discharge portion 21 have been loaded at a height not less than the prescribed height. The loading detecting sensor 29 outputs a detection result to the controller 31.

As shown in FIG. 2, the controller 31 is electrically connected to the printer 11, the scanner 13, the user interface 17, and the loading detecting sensor 29, via an electric connection path such as a cable. The controller 31 includes a memory and a processor. The processor is a CPU (Central Processing Unit), for example. A program (a software component) stored in the memory is executed by the processor (the hardware processor), and thereby the controller 31 realizes a software function. The controller 31 controls the whole of the image forming apparatus 1. For example, the controller 31 controls the printer 11, the scanner 13 and the user interface 17. For example, the controller 31 controls the printer 11 and the user interface 17, based on the detection result which the loading detecting sensor 29 has outputted. For example, when the sheets discharged in the discharge portion 20 have been loaded at a height not less than the prescribed height, the controller 31 stops the job of the printer 11.

Next, an operation of the image forming apparatus 1 of the present embodiment will be described. The image forming apparatus 1 discharges a sheet from the discharge port 23 to the discharge portion 21 by the discharge rollers 23a. That is, in the image forming apparatus 1 of the present embodiment, the sheet is discharged to the discharge portion 21 from the front side toward the rear side in the first direction D. In addition, the chassis 19 has the side surface 21a at the front side of the discharge portion 21 in which the discharge port 23 is provided. For the reason, at the time of taking out the sheet discharged to the discharge portion 21, a user of the image forming apparatus 1 puts one's hand into the discharge portion 21 from the side opening portion 35 or the upper opening portion 37. Next, the user grasps the sheet in the discharge portion 21, and takes out the sheet from the discharge portion 21 through the side opening portion 35 or the upper opening portion 37. For example, when the discharge portion 21 is higher than an eye line of the user because the installation position of the image forming apparatus 1 is high, the user operating at the front side of the image forming apparatus 1 cannot visually recognize the inside of the discharge portion 21.

On the other hand, in the image forming apparatus 1 of the present embodiment, the guide member 25 held at the above-described first position is provided at the end portion at the front side in the side opening portion 35, as described above. That is, the guide member 25 has the upper edge 25a extending toward upward from the rear side toward the front side in the first direction D, when the guide member 25 is at the first position. For the reason, even when the user cannot visually recognize the inside of the discharge portion 21, the user inserts one's hand from the side opening portion 35 into the discharge portion 21 to grasp the sheet, and draws one's hand to the front side along the upper edge 25a of the guide member 25, and can lift the sheet within the discharge portion 21. Accordingly, even in the state in which the user cannot visually recognize the inside of the discharge portion 21, the user can easily take out the sheet from the discharge portion 21. Accordingly, it is possible to improve workability at the time of taking out the sheet.

Further, since it becomes possible for the user to lift the sheet within the discharge portion 21, the user can smoothly move the sheet along the second direction W, and thereby it is possible to suppress that the sheet comes in contact with the discharge port 23 and the sheet is damaged. Particularly, in the present embodiment, the end portion at the front side of the upper edge 25a of the guide member 25 is held at the position (the first position) higher than the discharge port 23 by the energizing member 27. For the reason, since it is possible to lift the sheet at the position higher than the discharge port 23, it is possible to more effectively suppress contact of the sheet and the discharge port 23.

In addition, the guide member 25 is held at the above-described first position, and thereby regulates movement of the sheet in the second direction W. For the reason, the guide member 25 can prevent that the sheet which has been discharged to the discharge portion 21 and is loaded on the bottom surface of the discharge portion 21 drops through the side opening portion 35.

In addition, the guide member 25 is provided movably toward the lower side. For the reason, when the user inserts one's hand from the side opening portion 35 into the discharge portion 21, the user pushes down the guide member 25 to move it downward, and thereby an opening area of the side opening portion 35 can be enlarged, and as a result it becomes easy for the user to insert one's hand into the discharge portion 21. Accordingly, it is possible to improve workability at the time of taking out the sheet.

Further, the image forming apparatus 1 has the energizing member 27 to energize the guide member 25 toward the upper side (toward the above-described first position). For the reason, at the time of inserting one's hand from the side opening portion 35 into the discharge portion 21, the user can easily push down the guide member 25 by one's hand (a wrist, a brachial region and so on, for example), and can return the pushed-down guide member 25 to the position (the first position) before pushing down.

In addition, the energizing member 27 pushes up the hand of the user via the guide member 25. For the reason, the force required when the user lifts the sheet can be supported by the energizing force of the energizing member 27. Accordingly, the user can easily lift the sheet within the discharge portion 21.

In addition, the image forming apparatus 1 has the loading detecting sensor 29 which is provided in the guide member 25 and detects the sheets which have been housed at a height not less than the prescribed height in the discharge portion 21. For this reason, it is possible to reduce structural objects projecting inside the discharge portion 21, compared with a case of providing a lever-type contact sensor, for example, at the upper portion of the discharge port, as the loading detecting sensor. Accordingly, at the time of taking out the sheets from the discharge portion 21, it is possible to suppress that the sheets come in contact with the structural object provided in the discharge portion 21 and thereby the sheets are damaged.

(Second Embodiment)

Next, a second embodiment will be described using FIG. 6 and FIG. 7. The image forming apparatus 1 of the second embodiment is different from the image forming apparatus 1 of the first embodiment in a point that a drive source 41 to move the guide member 25 in the vertical direction is provided, in place of the energizing member 27. In addition, the components other than components described below are the same as the first embodiment.

Figure 6:
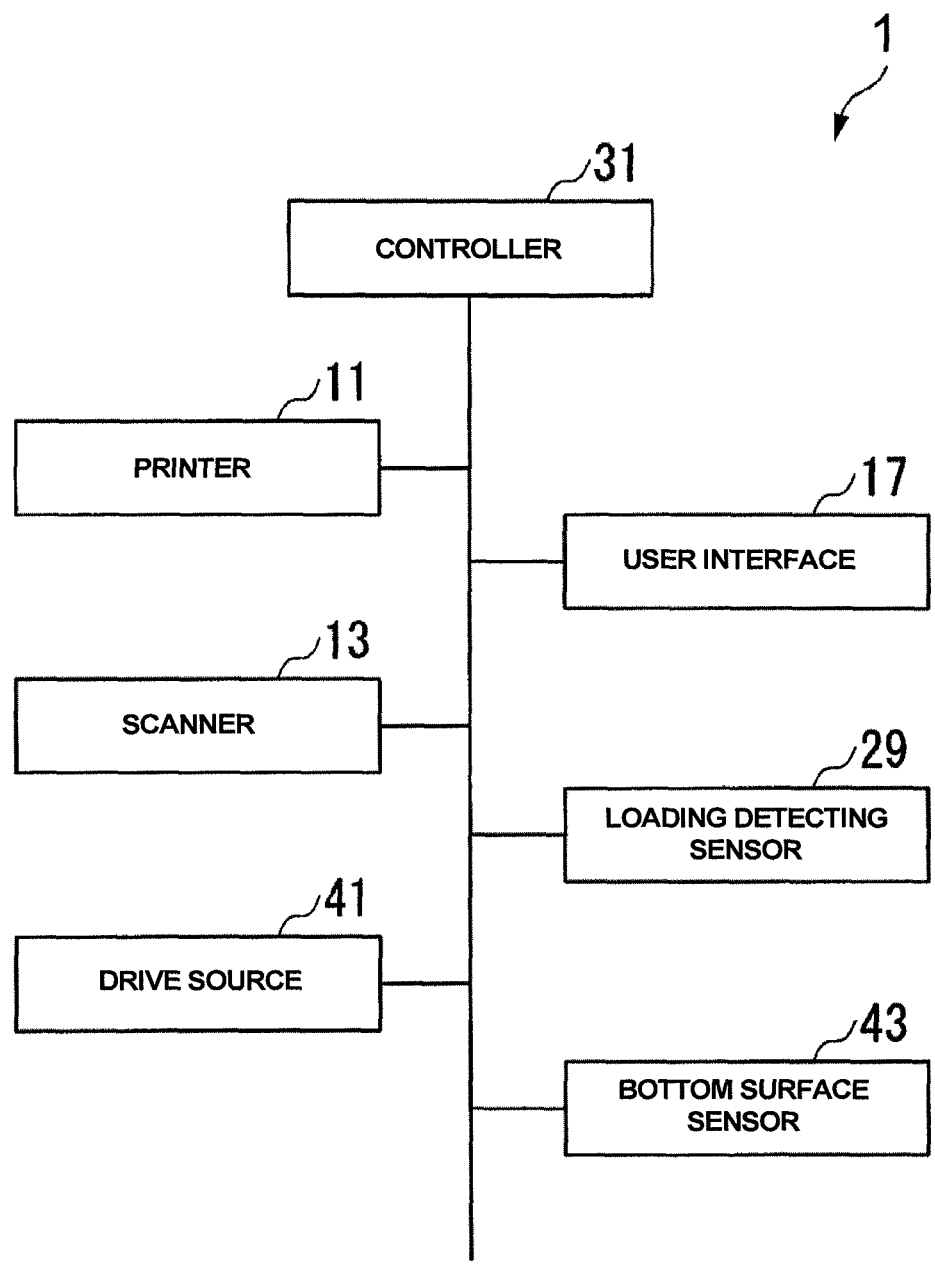
FIG. 6 is a block diagram showing a system configuration of an image forming apparatus of a second embodiment.

FIG. 6 is a block diagram showing a system configuration of the image forming apparatus 1 of the second embodiment. As shown in FIG. 6, the image forming apparatus 1 has the drive source 41 and a bottom surface sensor 43 (a first sensor). The drive source 41 vertically moves the guide member 25 (refer to FIG. 4). The drive source 41 is a motor or the like coupled to the guide member 25, for example.

The bottom surface sensor 43 detects presence or absence of a sheet which comes in contact with a prescribed position in the bottom surface of the discharge portion 21 (refer to FIG. 4). The bottom surface sensor 43 detects lifting of the sheet housed in the discharge portion 21. For example, the bottom surface sensor 43 is a contact sensor installed on the bottom surface of the discharge portion 21. The bottom surface sensor outputs a detection result to the controller 31.

The controller 31 is electrically connected to the drive source 41 and the bottom surface sensor 43 via an electric connection path such as a cable. The controller 31 controls the drive source 41, based on the detection result which the bottom surface sensor 43 has outputted.

Figure 7:
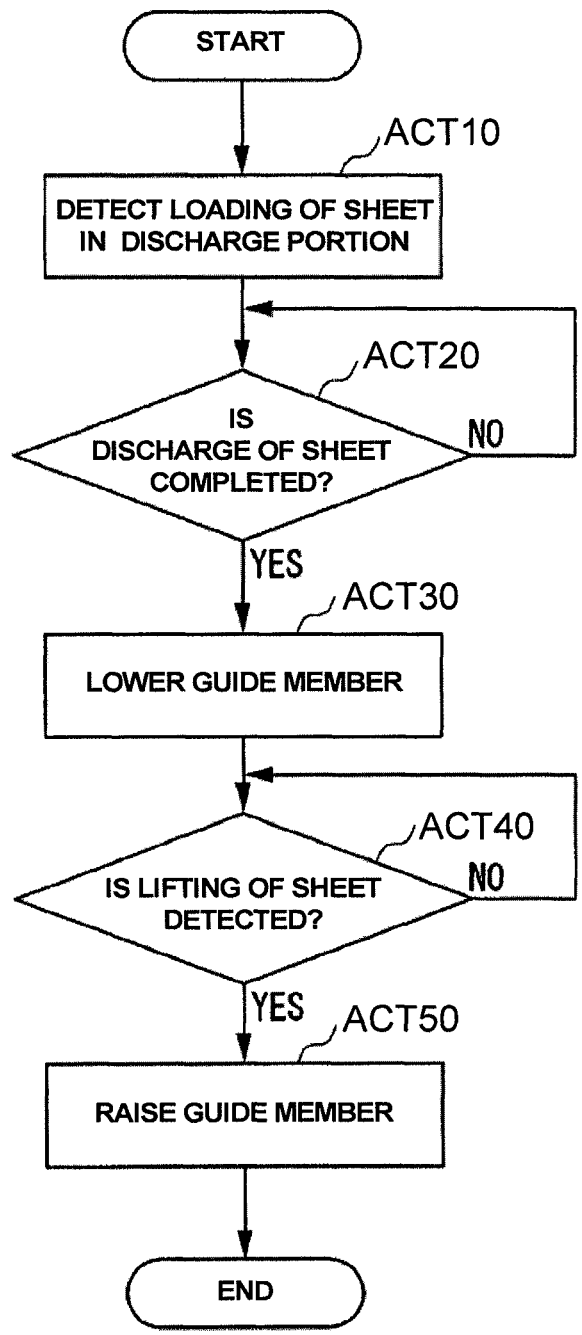
FIG. 7 is a flow chart showing an example of a processing of the controller of the second embodiment.

FIG. 7 is a flow chart showing an example of a processing of the controller 31 of the second embodiment. As shown in FIG. 7, firstly in ACT10, the controller 31 detects that the sheet has been loaded in the discharge portion 21, based on the detection result of the bottom surface sensor 43. Next, in ACT20, when detecting the loading of the sheet in the discharge portion 21, the controller 31 determines whether or not discharge of the sheet from the discharge port 23 has been completed in ACT20. For example, the controller 31 determines whether or not the job of printing by the printer 11 has been completed. When determining that the discharge of the sheet from the discharge port 23 has not been completed (ACT20: No), the controller 31 executes the processing of ACT20 again.

When determining that the discharge of the sheet from the discharge port 23 has been completed (ACT20: Yes), the controller 31 controls the drive source 41 so that the guide member 25 is lowered from the first position toward the second position, in ACT30. After this, the controller 31 determines whether or not the sheet housed (loaded) in the discharge portion 21 has been lifted, based on the detection result of the bottom surface sensor 43, in ACT40. When determining that the sheet housed in the discharge portion 21 has not been lifted (ACT40: No), the controller 31 executes the processing of ACT40 again.

When having determined that the sheet housed in the discharge portion 21 has been lifted (ACT40: Yes), the controller 31 controls the drive source 41 so that the guide member 25 is raised from the second position toward the first position, in ACT50. And the controller finishes the processing.

According to the image forming apparatus 1 configured as described above, when the discharge of the sheet from the discharge port 23 has been completed, the controller 31 controls the drive source 41 so that the guide member 25 is moved from the first position toward the second position. For the reason, when the discharge of the sheet from the discharge port 23 has been completed, and the user inserts one's hand from the side opening portion 35 into the discharge portion 21, in order to take out the sheet from the discharge portion 21, the opening area of the side opening portion 35 can be enlarged, and thereby it becomes easy for the user to insert one's hand into the discharge portion 21. Accordingly, it is possible to improve workability at the time of taking out the sheet.

In addition, when the bottom surface sensor 43 detects the lifting of the sheet, the controller 31 controls the drive source 41 so that the guide member 25 is moved from the second position toward the first position. For the reason, the drive source 41 pushes up the hand of the user via the guide member 25. By this means, the force required when the user lifts the sheet can be supported. Accordingly, the user can easily lift the sheet in the discharge portion 21.

In addition, in the second embodiment, the drive source 41 is the motor, but is not limited to this. For example, the drive source 41 may be made a drive source in which a solenoid and an energizing member are combined to move the guide member 25 in the vertical direction.

In addition, in the example shown in the drawings, the guide member 25 is formed in a triangular shape when seen from the second direction W, but the shape of the guide member 25 is not particularly limited. The guide member 25 has only to have the upper edge 25a extending toward upward from the rear side toward the front side in the first direction D.

In addition, in the above-described embodiment, the guide member 25 is provided rotatably with respect to the chassis 19, but is not limited to this. The guide member 25 may be provided so that it is linearly movable in the vertical direction along a member extending linearly such as a rail, for example.

In addition, in the above-described embodiment, the upper edge 25a of the guide member 25 extends linearly when seen from the second direction W, but is not limited to this. The upper edge 25a of the guide member 25 may extend in an arc shape recessed toward the lower side and toward the front side in the first direction D, when seen from the second direction W, for example.

According to at least one of the embodiments described above, the image forming apparatus 1 has the discharge port 23 to discharge the sheet to the discharge portion 21 from the front side toward the rear side in the first direction D of the chassis 19, and the guide member 25 which is provided at the end portion at the front side in the side opening portion 35 of the discharge portion 21 and has the upper edge 25a extending toward upward from the rear side toward the front side. For the reason, the user inserts one's hand from the side opening portion 35 into the discharge portion 21 to grasp the sheet and draws one's hand to the frond side along the upper edge 25a of the guide member 25, and thereby the user can lift the sheet in the discharge portion 21. Accordingly, even when the user cannot visually recognize the inside of the discharge portion 21, the user can easily take out the sheet from the discharge portion 21. Accordingly, it is possible to improve workability at the time of taking out the sheet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a chassis having a discharge port to discharge a sheet formed with an image in a first direction directing from a front side toward a rear side opposite to the front side;
a discharge portion which has a space surrounded by wall surfaces of the chassis, and a side opening portion to open the space toward one direction out of second directions orthogonal to the first direction, receives the sheet to be discharged from the discharge port, and houses the sheet in the space so that the sheet can be taken out from the side opening portion; and
a guide member which is arranged at an end portion at the front side in the side opening portion, extends along the first direction, and has an upper edge extending toward upward from the rear side toward the front side in the first direction.

2. An image forming apparatus, comprising:
a chassis having a discharge port to discharge a sheet formed with an image in a first direction;
a discharge portion which has a space surrounded by wall surfaces of the chassis, and a side opening portion to open the space toward one direction out of second directions orthogonal to the first direction, receives the sheet to be discharged from the discharge port, and houses the sheet in the space so that the sheet can be taken out from the side opening portion; and
a guide member which is arranged at an end portion at an upstream side in the first direction in the side opening portion, extends along the first direction, and has an upper edge extending upward from a downstream side in the first direction toward the upstream side in the first direction.

3. The image forming apparatus according to claim 2, wherein:
the guide member extends along the first direction, and is provided at the end portion at the upstream side in the first direction in the side opening portion so that the guide member can move between a first position in which the upper edge extends toward upward from the downstream side in the first direction toward the upstream side in the first direction and a second position in which the guide member is retracted from the first position.

4. The image forming apparatus according to claim 3, further comprising:
a drive source to move the guide member between the first position and the second position.

5. The image forming apparatus according to claim 4, further comprising:
a first sensor to detect lifting of the sheet housed in the discharge portion; and
a controller to control the drive source based on a detection result of the first sensor.

6. The image forming apparatus according to claim 5, wherein:
the controller controls the drive source so as to move the guide member from the first position toward the second position, when discharge of the sheet from the discharge port has been completed.

7. The image forming apparatus according to claim 6, wherein:
the controller controls the drive source so as to move the guide member from the second position toward the first position, when the first sensor has detected lifting of the sheet.

8. The image forming apparatus according to claim 2, wherein:
the first position is a position in which the guide member has moved to an upper side from the end portion at the upstream side in the first direction in the side opening portion to block a part of the side opening portion; and
the second position is a position in which the guide member has moved to a lower side from the end portion at the upstream side in the first direction in the side opening portion.

9. The image forming apparatus according to claim 8, further comprising:
an energizing member to energize the guide member toward an upper side.

10. The image forming apparatus according to claim 9, wherein:
the energizing member holds the guide member at the first position.

11. The image forming apparatus according to claim 2, further comprising:

a second sensor provided in the guide member to detect the sheets housed in the discharge portion at a height not less than a prescribed height.

12. The image forming apparatus according to claim 2, further comprising:

a user interface to accept an operation for image forming;

the user interface being provided at the upstream side in the first direction of the chassis.

13. The image forming apparatus according to claim 2, further comprising:

a sheet housing device to house a sheet used for image forming, the sheet housing device being provided at the upstream side in the first direction of the chassis, and being drawable from a side surfaced at the upstream side in the first direction of the chassis to the upstream side in the first direction of the chassis.

14. The image forming apparatus according to claim 2, wherein:

the guide member is formed on the upstream side in the first direction of the chassis from the middle in the first direction of the chassis.

15. An image forming apparatus, comprising:

a chassis having a discharge port to discharge a sheet formed with an image in a first direction;

a discharge portion which has a space surrounded by wall surfaces of the chassis, and a side opening portion to open the space toward one direction out of second directions orthogonal to the first direction, receives the sheet to be discharged from the discharge port, and houses the sheet in the space so that the sheet can be taken out from the side opening portion; and a guide member which extends along the first direction, and is provided at an end portion at an upstream side in the first direction in the side opening portion so that the guide member can move between a first position in which an upper edge extends upward from a downstream side in the first direction toward the upstream side in the first direction, and a second position in which the guide member is retracted from the first position.

* * * * *